(No Model.)
M. DALEY.
JOURNAL BEARING.
No. 450,004. Patented Apr. 7, 1891.
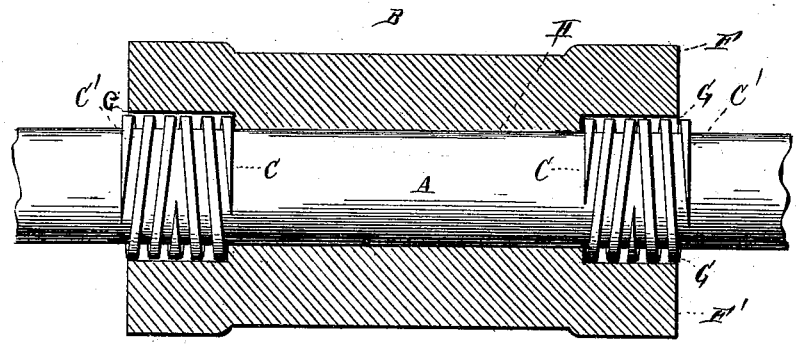
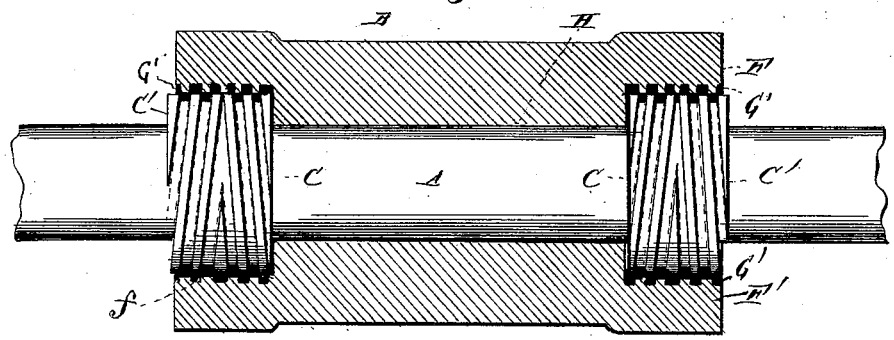
Witnesses
Inventor
Michael Daley.
by E. W. Anderson.
his Attorney

UNITED STATES PATENT OFFICE.

MICHAEL DALEY, OF DE KALB, ILLINOIS.

JOURNAL-BEARING.

SPECIFICATION forming part of Letters Patent No. 450,004, dated April 7, 1891.

Application filed August 16, 1890. Serial No. 362,223. (No model.)

*To all whom it may concern:*

Be it known that I, MICHAEL DALEY, a citizen of the United States, and a resident of De Kalb, in the county of De Kalb and State of Illinois, have invented certain new and useful Improvements in Devices for Excluding Dust and Retaining Oil in Journal-Bearings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical longitudinal section, and Fig. 2 is a similar view.

This invention relates to an improved guard for axle or shafts and their box, bearing, or hub adapted to exclude dust, mud, &c., and yet retain the lubricant or oil; and it consists in the novel construction and combination of parts, hereinafter disclosed.

In the drawings, A refers to a shaft or axle and B to the bearing or box or hub therefor. The shaft or journal A has upon its surface oppositely inclined or directed screw-threads C C, arranged near the ends of the bearing, box, or hub B, the outer threads C' being directed outward, so that the revolving of the shaft, hub, or journal will cause the dust or mud that may have partly entered the end of the box, bearing, or hub B to be forced outwardly by each revolution of the spiral screw-thread or inclined surface C' to prevent the dust or mud from lodging thereon and from coming in contact with the bearing-surface of said journal or shaft and its box or hub, thus preventing the admixture of dust and the oil or lubricant. The inner threads C are inclined or directed inward, so that the revolving of the shaft or journal will cause the oil that would have a tendency to run outwardly to be forced back into the journal by each revolution of the shaft, journal, or hub by said oil coming in contact with said inclined screw-threaded surface C, which, although arranged contiguously to, but being separate from, the threads C', feeds or directs the oil or lubricant inwardly, thus preventing it from flowing or running, as it otherwise would, toward the end of the journal, axle, or hub, and commingling with the dust or mud and wasting.

The inclined threads may be upon the axle or shaft or upon the box, bearing, or hub, or they may be upon both, as in vehicles where the axle does not revolve, but the hub revolves upon the axle. I prefer to place the oppositely-inclined screw-threaded surface C C' upon the inside of the hub, box, or moving part at each end of the bearing-surface of said hub-box; but where the axle or shaft revolves, I prefer to place the inclined screw-threads C C' upon the shaft or a journal shrunk or otherwise fastened upon the revolving shaft as the centrifugal force throws the dust and mud out of the grooves between the threads and upon the surface of the box or bearing, which, being stationary, holds the dust or mud from turning, and the edge or corner of the inclined screw-thread throws it out.

As one way of applying the screw-thread collars, they may be shrunk upon the journals after the insertion of the latter into the hub or box.

In slow-running hubs, bearings, or journals I prefer to place the oppositely-inclined screw-threads upon the revolving and stationary part of the journal and box or hub, as the case may be, so that they cross each other and force the dust or mud outwardly and the oil inwardly, no matter whether they cling to the moving or stationary part.

It is obvious that the principle of my invention can be carried out by spirally notching the shaft, journal, or hub or by throwing up thereon a spiral scroll; or the same end may be obtained by providing the shaft or journal and its bearings or hub, either or both, with a spiral flange. It is also obvious that the invention is applicable to corn-cultivators, plows, thrashing-machines, disk-harrows, planers, emery-wheels, saw-mills, sewing-machines, watches, clocks, line and counter shafts, engines, locomotives, cars, wagons, carriages, bicycles, mills, or other machinery or vehicles employing an axle or shaft.

Having thus described my invention, what I claim as new, and desire to secure by Letters Patent, is—

1. The journal or shaft having sets of screw-threads thereon arranged at distances apart about equal to the length of the journal-box, one portion of each set being inclined or directed outwardly and the other portion being inclined or directed inwardly, whereby the escaping lubricant is carried back into the journal and the entering dirt carried outwardly, in combination with the box adapted to receive such sets of threads, substantially as specified.

2. The combination, with the journal or shaft having screw-threads thereon, one directed or inclined outward or in one direction and the other inclined or directed inward, of the box or hub having corresponding screw-threads, substantially as and for the purpose set forth.

In testimony whereof I affix my signature in presence of two witnesses.

MICHAEL DALEY.

Witnesses:
CHAS. A. ANDERSON,
SAMUEL PETERSON.